US012809015B2

(12) United States Patent
Chang et al.

(10) Patent No.: US 12,809,015 B2
(45) Date of Patent: Nov. 24, 2026

(54) OBJECT TRACKING METHOD BASED ON RADAR POINT CLOUD

(71) Applicant: Wistron Corporation, New Taipei City (TW)

(72) Inventors: Yao-Tsung Chang, New Taipei City (TW); Tsung-Yin Tsou, New Taipei City (TW); Yin-Yu Chen, New Taipei City (TW); Kai-Jen Cheng, New Taipei City (TW); Cheng-Nung Liao, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 224 days.

(21) Appl. No.: 18/746,525

(22) Filed: Jun. 18, 2024

(65) Prior Publication Data

US 2025/0314761 A1 Oct. 9, 2025

(30) Foreign Application Priority Data

Apr. 8, 2024 (TW) ................................ 113113043

(51) Int. Cl.

| | |
|---|---|
| ***G01S 13/72*** | (2006.01) |
| ***G01S 13/52*** | (2006.01) |
| ***G01S 13/89*** | (2006.01) |
| ***G06T 7/246*** | (2017.01) |
| ***G06T 7/60*** | (2017.01) |
| ***G06V 10/762*** | (2022.01) |

(52) U.S. Cl.

CPC ............ *G01S 13/726* (2013.01); *G01S 13/52* (2013.01); *G01S 13/89* (2013.01); *G06T 7/246* (2017.01); *G06T 7/60* (2013.01); *G06V 10/762* (2022.01); *G06T 2207/10028* (2013.01); *G06T 2207/30241* (2013.01)

(58) Field of Classification Search

CPC ........ G01S 13/726; G01S 13/52; G01S 13/89; G01S 7/415; G01S 13/42; G01S 13/584; G06T 7/246; G06T 7/60; G06T 2207/10028; G06T 2207/30241; G06V 10/762

See application file for complete search history.

(56) References Cited

FOREIGN PATENT DOCUMENTS

CN 113009441 B * 8/2022 ............. G01S 7/411

* cited by examiner

*Primary Examiner* — Timothy A Brainard
*Assistant Examiner* — Bongani Jabulani Mashele
(74) *Attorney, Agent, or Firm* — McClure, Qualey & Rodack, LLP

(57) ABSTRACT

An object tracking method based on radar point cloud includes the following steps: performing range processing, Doppler processing, and angle processing on a digital signal to obtain a first point-cloud image; recognizing whether there is a first cluster in the first point-cloud image; and recording a first location of the first cluster in response to recognizing that there is the first cluster in the first point-cloud image; or performing range processing and angle processing on the digital signal to obtain a second point-cloud image in response to recognizing that there is not the first cluster in the first point-cloud image; recognizing whether there is a second cluster at a corresponding recorded first location in the second point-cloud image; and recognizing that a tracking target is in a static state in response to recognizing that there is the second cluster at the first location.

20 Claims, 10 Drawing Sheets

OBJECT TRACKING METHOD BASED ON RADAR POINT CLOUD

CROSS-REFERENCE TO RELATED APPLICATION

This non-provisional application claims priority under 35 U.S.C. § 119(a) to patent application Ser. No. 11/311,3043 filed in Taiwan, R.O.C. on Apr. 8, 2024, the entire contents of which are hereby incorporated by reference.

BACKGROUND

Technical Field

The present disclosure relates to an object tracking method, and particularly relates to an object tracking method based on radar point cloud.

Related Art

A radar point cloud processing technology can quickly track a movement trajectory of an object on a premise that a radar can process point cloud data. When the object is static, the point cloud gradually disappears and cannot continue to be analyzed. In addition, when the radar loses point cloud information, location information of the object cannot be obtained, the object may depart from a detection region of the radar or be static, and an actual state of the object cannot be determined.

SUMMARY

In view of this, an embodiment of the present disclosure proposes an object tracking method based on radar point cloud, including: collecting and demodulating, by a radar unit, a radar echo to obtain a digital signal; and performing, by a processing unit, the following steps: performing range processing, Doppler processing, and angle processing on the digital signal to obtain a first point-cloud image; recognizing whether there is a first cluster in the first point-cloud image; and recording a first location of the first cluster in response to recognizing that there is the first cluster in the first point-cloud image; or performing range processing and angle processing on the digital signal to obtain a second point-cloud image in response to recognizing that there is not the first cluster in the first point-cloud image; recognizing whether there is a second cluster at a corresponding recorded first location in the second point-cloud image; and recognizing that a tracking target is in a static state in response to recognizing that there is the second cluster at the first location.

An embodiment of the present disclosure proposes an object tracking method based on radar point cloud, including: collecting and demodulating, by a radar unit, a radar echo to obtain a digital signal; and performing, by a processing unit, the following steps: performing range processing and angle processing on the digital signal to obtain first data; performing Doppler processing on the first data to obtain second data; recognizing whether there is a first peak value in the second data; recognizing whether there is a second peak value in the first data in response to recognizing that there is not the first peak value in the second data; and recognizing that a tracking target is in a static state in response to recognizing that there is the second peak value in the first data.

An embodiment of the present disclosure proposes an object tracking method based on radar point cloud, including: collecting and demodulating, by a radar unit, a radar echo to obtain a digital signal; and performing, by a processing unit, the following steps: performing range processing and angle processing on the digital signal to obtain first data; generating a first point-cloud image based on the first data; recording a first location of at least one first cluster based on the first point-cloud image; performing Doppler processing on the first data to obtain a second point-cloud image; recording a second location of at least one second cluster based on the second point-cloud image; and recognizing a state of at least one tracking target based on the first location and the second location.

According to the object tracking method based on radar point clouds proposed in some embodiments of the present disclosure, a problem that the state of the tracking target cannot be tracked with disappearance of a conventional point cloud can be solved, and it can be determined that the conventional point cloud disappears because the tracking target is static or departs.

DETAILED DESCRIPTION

To understand the technical features, content, and advantages of the present disclosure and the effects achievable in the present disclosure, the present disclosure is described in detail below in the form of embodiments with reference to the accompanying drawings. The accompanying drawings are intended only to illustrate and assist this specification and do not necessarily use real scales and accurate configurations obtained after implementation of the present disclosure. Therefore, the scales and configuration relationships of the accompanying drawings are not intended to interpret and limit the scope of the present disclosure in actual implementation.

The same reference signs in all the drawings are used to represent the same or similar elements. "Include/comprise" mentioned herein is an open term, and thus is to be interpreted as "include/comprise but not limited to". "Coupling" used herein means a "direct" physical contact or electrical contact or an "indirect" physical contact or electrical contact between two or more elements. Terms "first", "second", and the like used herein are used to distinguish between corresponding elements, and unless otherwise specified, they are not intended to sort the corresponding elements or limit differences between the corresponding elements, and are also not intended to limit the scope of the present disclosure.

Figure 1:
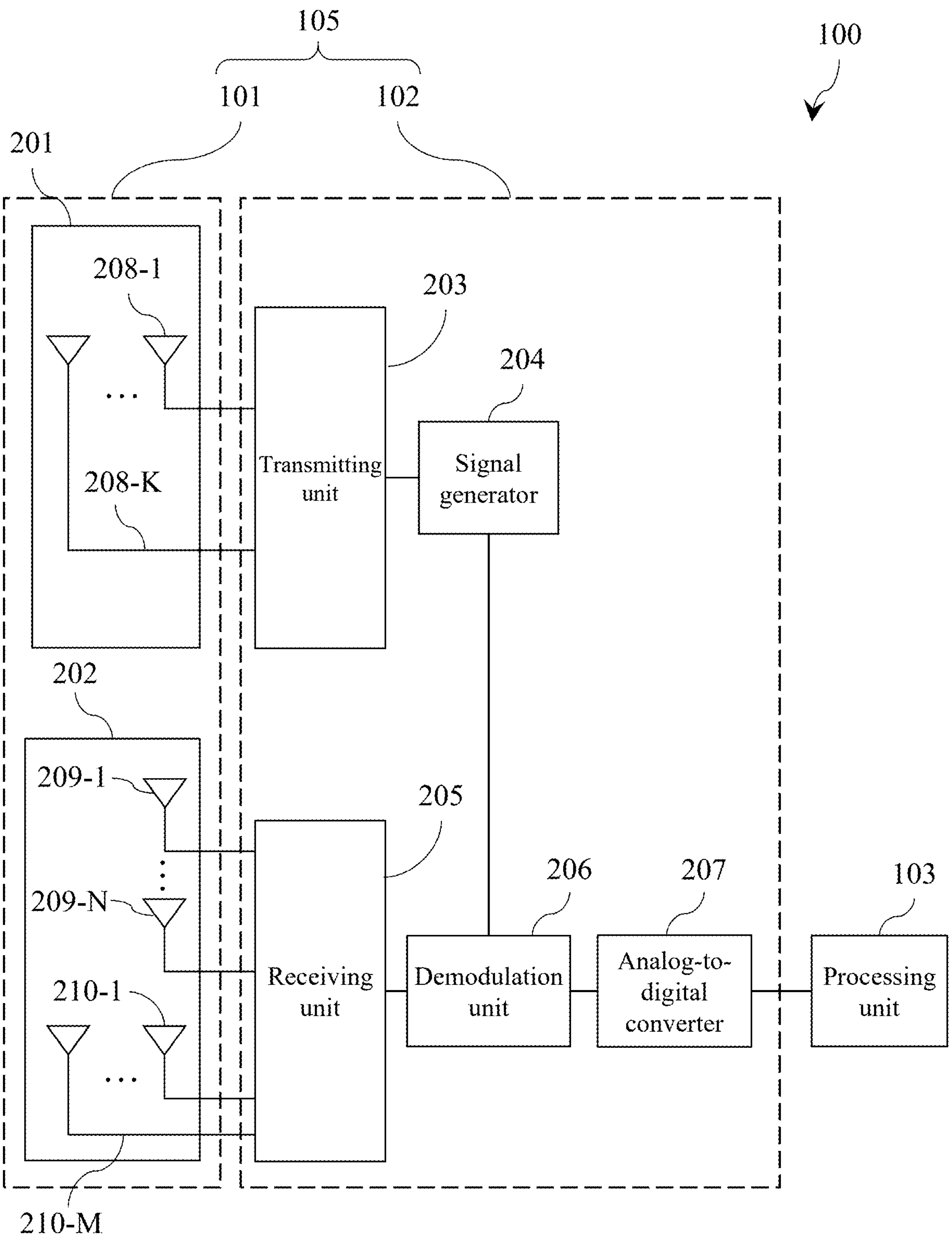
FIG. 1 is a block diagram of a radar detection system according to some embodiments of the present disclosure.

FIG. 1 is a block diagram of a radar detection system 100 according to some embodiments of the present disclosure. Refer to FIG. 1. The radar detection system 100 includes a radar unit 105 and a processing unit 103 that are coupled to each other. The radar unit 105 includes an antenna unit 101 and a front-end unit 102. The antenna unit 101 is configured to radiate a radio frequency signal to a free space. When colliding with an object in the free space, the radio frequency signal is reflected to obtain a feedback signal. The antenna unit 101 receives the feedback signal (that is, a radar echo) of the radio frequency signal. The front-end unit 102 is configured to generate the foregoing radio frequency signal, and demodulate and digitalize the feedback signal to obtain a digital signal. The processing unit 103 is configured to receive the digital signal, and perform signal processing on the digital signal.

In some embodiments of the present disclosure, the radio frequency signal is a frequency-modulated continuous wave (FMCW) signal.

Refer to FIG. 1. The antenna unit 101 further includes a transmitting antenna unit 201 and a receiving antenna unit 202. The transmitting antenna unit 201 includes a plurality of transmitting antennae 208-1 to 208-K. The transmitting antennae 208-1 to 208-K radiate the radio frequency signal to the free space. The receiving antenna unit 202 includes a plurality of receiving antennae 209-1 to 209-N and 210-1 to 210-M to receive the feedback signal. K, N, and M are positive integers, and represent quantities of the transmitting antennae 208-1 to 208-K and the receiving antennae 209-1 to 209-N and 210-1 to 210-M configured. Actual quantities of the transmitting antennae and the receiving antennae are determined by a requirement of the radar detection system 100, and are not limited in the present disclosure. In some embodiments, the receiving antennae 209-1 to 209-N are arranged in an X axis, and the receiving antennae 210-1 to 210-M are arranged in a Y axis.

A design of the transmitting antenna generally needs to consider a frequency of a signal to be transmitted, a field of view (FOV), and a purpose. The antenna may be designed to a lens antenna, a patch antenna, or a waveguide leaky-wave antenna. In some embodiments of the present disclosure, the transmitting antennae 208-1 to 208-K are patch antennae.

A design of the receiving antenna generally needs to consider a frequency of a signal to be received. If a direction of an object is to be recognized, a plurality of sets of receiving antennae are needed. The receiving antenna generally includes a plurality of beams, to receive object echoes of different azimuths and accordingly determine the direction of the object. The design of the receiving antenna needs to consider a frequency range of a radio frequency signal to be received and whether a direction of an object to be detected needs to be recognized. If the direction is to be recognized, a design of a single input multiple output (SIMO) antenna or a design of a multiple input multiple output (MIMO) antenna needs to be considered. In some embodiments of the present disclosure, the receiving antennae 209-1 to 209-N and 210-1 to 210-M are patch antennae, and the antenna is implemented by a printed circuit board.

As shown in FIG. 1, the front-end unit 102 includes a signal generator 204, a transmitting unit 203, a receiving unit 205, a demodulation unit 206, and an analog-to-digital converter 207. The signal generator 204 generates the radio frequency signal, and transmits the radio frequency signal to the transmitting unit 203 and the demodulation unit 206. The transmitting unit 203 includes a power amplifier (PA), and is configured to amplify the radio frequency signal, and transmit an amplified radio frequency signal to the transmitting antenna unit 201 to radiate the radio-frequency signal to the free space.

The receiving unit 205 includes a signal amplifier and a filter (not shown in this figure), and is configured to receive the feedback signal received by the antenna unit 101 and amplify and filter the received feedback signal. The demodulation unit 206 is coupled to the signal generator 204 and the receiving unit 205. The demodulation unit 206 receives the radio frequency signal generated by the signal generator 204 and an amplified and filtered feedback signal received by the receiving unit 205, demodulate the amplified and filtered feedback signal based on the radio frequency signal, perform mixing combination, and filter out a high-frequency signal. The analog-to-digital converter 207 converts a demodulated feedback signal into a digital signal, and transmits the digital signal to the processing unit 103 for subsequent signal processing.

In some embodiments of the present disclosure, the signal generator 204 generates a linearly frequency-modulated signal with a start frequency of 77 GHz, a stop frequency of 81 GHz, and a time cycle Tc of 40 μs. In some embodiments of the present disclosure, the signal generator 204 generates a linearly frequency-modulated signal with a start frequency of 24 GHz, a stop frequency of 28 GHz, and a time cycle of 40 μs. However, the foregoing values of the start frequency, the stop frequency, and the time cycle are merely examples, and the present disclosure is not limited thereto. Fast Fourier transform (FFT) signal processing may be performed appropriately on the linearly frequency-modulated signal to detect a location and a speed of the object or even a breath, a heartbeat, and the like of the object. The demodulation unit 206 performs mixing combination on the frequency-modulated signal generated by the signal generator 204 and the amplified and filtered feedback signal received by the receiving unit 205, and filters out a high-frequency signal, to generate an intermediate frequency (IF) signal. The analog-to-digital converter 207 converts the IF signal into a digital signal, and transmits the digital signal to the processing unit 103 for subsequent signal processing to obtain information included in the feedback signal.

Figure 2:
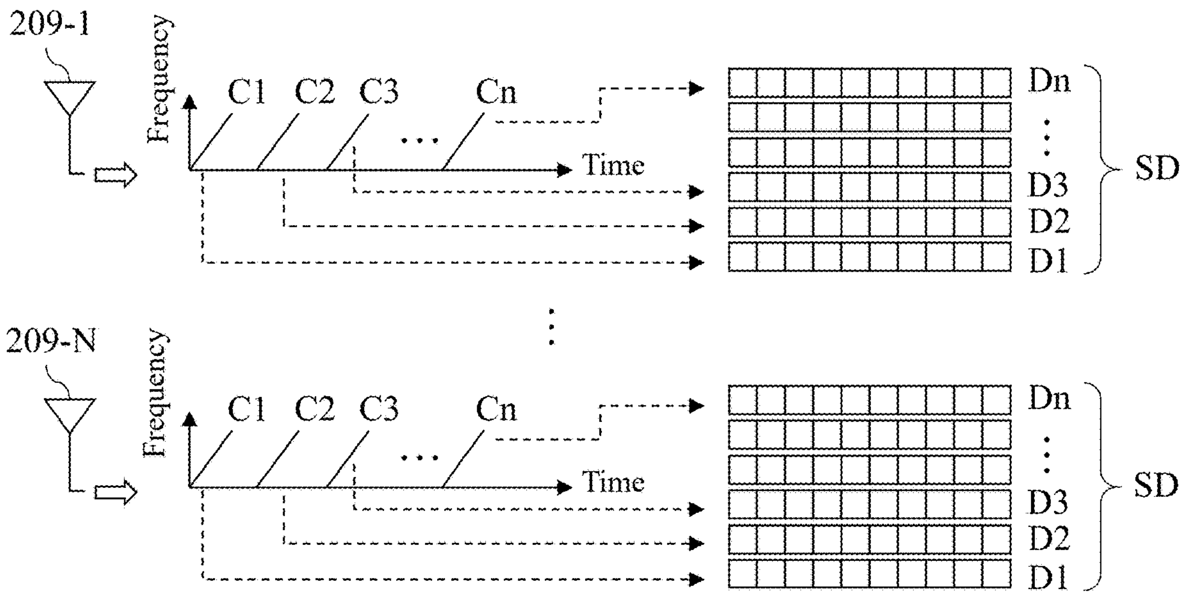
FIG. 2 is a schematic diagram of radar echo signal processing according to some embodiments of the present disclosure.

Refer to FIG. 2. FIG. 2 is a schematic diagram of radar echo signal processing according to some embodiments of the present disclosure. As shown in FIG. 2, feedback signals received by a plurality of receiving antennae (for example, 209-1 to 209-N) in one axis are demodulated and converted into digital signals SD. The feedback signal includes a plurality of chirp signals C1 to Cn in each frame, where n is a positive integer. Linear frequency modulation is performed on the chirp signals C1 to Cn whose frequencies linearly increase with time. The chirp signals C1 to Cn are demodulated by the demodulation unit 206 and then converted into digital signals D1 to Dn by the analog-to-digital converter 207, where n is a positive integer. In other words, the digital signal D1 is formed after transmission, reflection, reception, demodulation, and analog-to-digital conversion of the chirp signal C1, the digital signal D2 is formed after transmission, reflection, reception, demodulation, and analog-to-digital conversion of the chirp signal C2, and so on.

Figure 3:
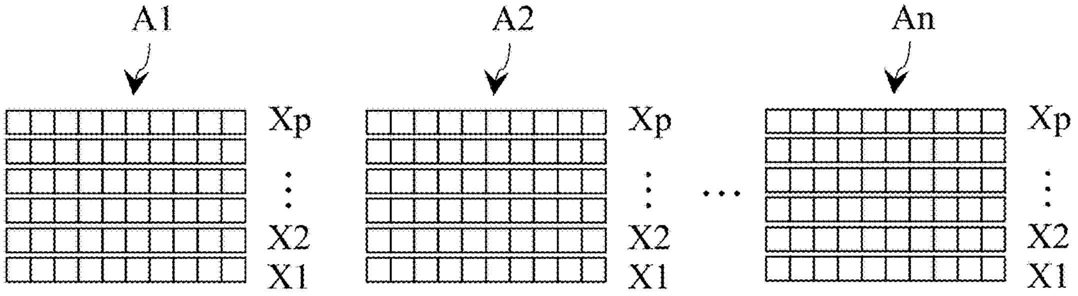
FIG. 3 is a schematic diagram of a digital signal according to some embodiments of the present disclosure.

Refer to FIG. 3. FIG. 3 is a schematic diagram of the digital signal SD according to some embodiments of the present disclosure. The digital signals D1 to Dn corresponding to the same chirp signals C1 to Cn received by receiving antennae X1 to Xp (p is a positive integer) are arranged in matrices A1 to An (n is a positive integer). For example, each row of the matrix A1 is the digital signal D1 obtained based on the first chirp signal C1 received by each of the receiving antennae X1 to Xp, each row of the matrix A2 is the digital signal D2 obtained based on the second chirp signal C2 received by each of the receiving antennae X1 to Xp, and so on.

Figure 4:
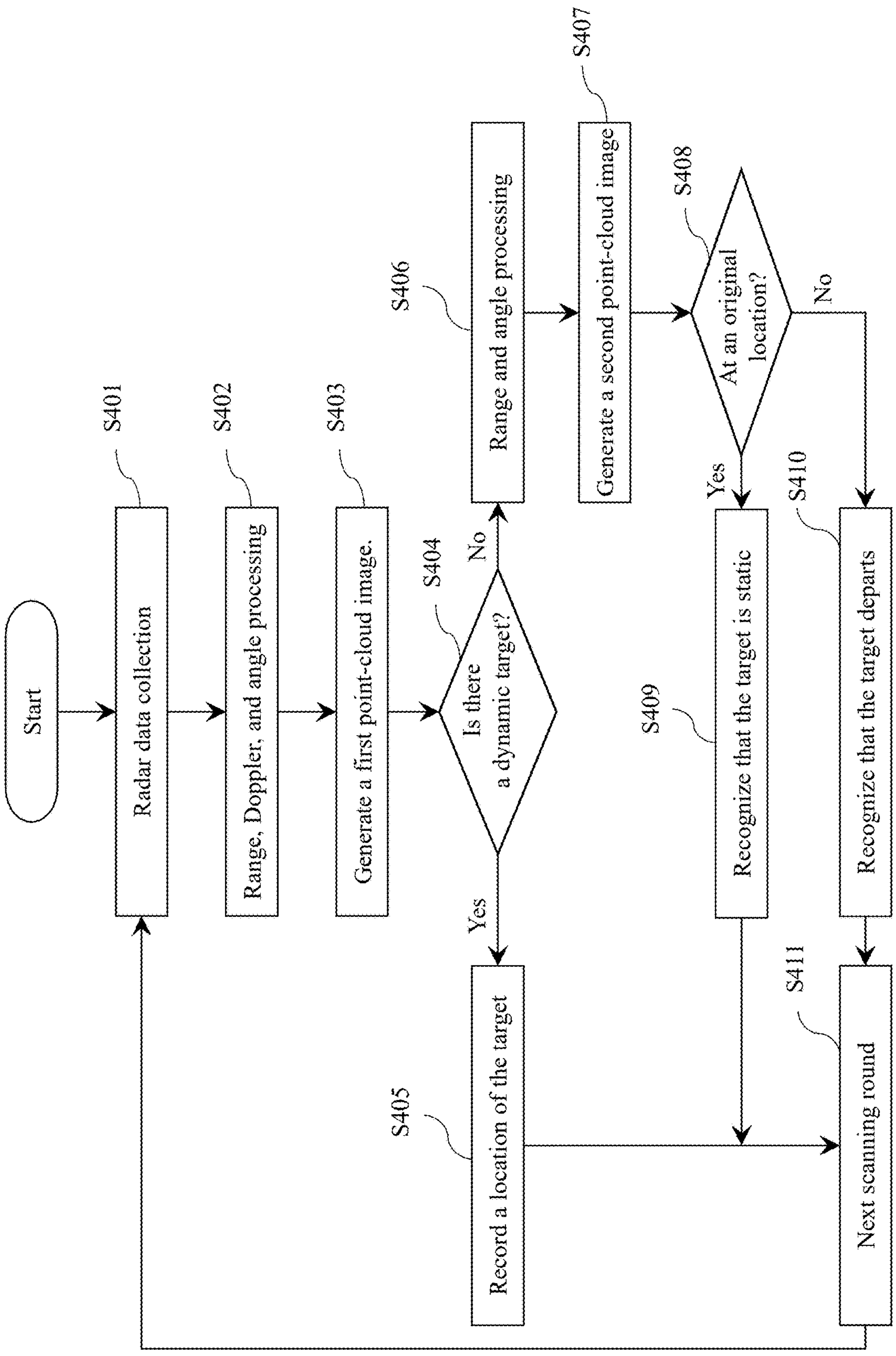
FIG. 4 is a flowchart of an object tracking method based on radar point cloud according to an embodiment of the present disclosure.

Refer to FIG. 4. FIG. 4 is a flowchart of an object tracking method based on radar point cloud according to an embodiment of the present disclosure. The method is applicable to a single tracking target. In step S401, radar data is collected. The radar unit 105 periodically radiates a radio frequency signal to scan a detection region. Generally, the detection region is equivalent to coverage of an FOV of the radar unit 105. The radio frequency signal is the foregoing linearly frequency-modulated signal. In a scanning round (or a frame), the linearly frequency-modulated signal includes a plurality of chirp signals C1 to Cn. The radar unit 105 collects a corresponding feedback signal in the same scanning round, accordingly obtains an IF signal through demodulation, and converts the IF signal into a digital signal SD. The processing unit 103 performs steps S402 to S410 on the collected radar data in a scanning round.

Figure 5:
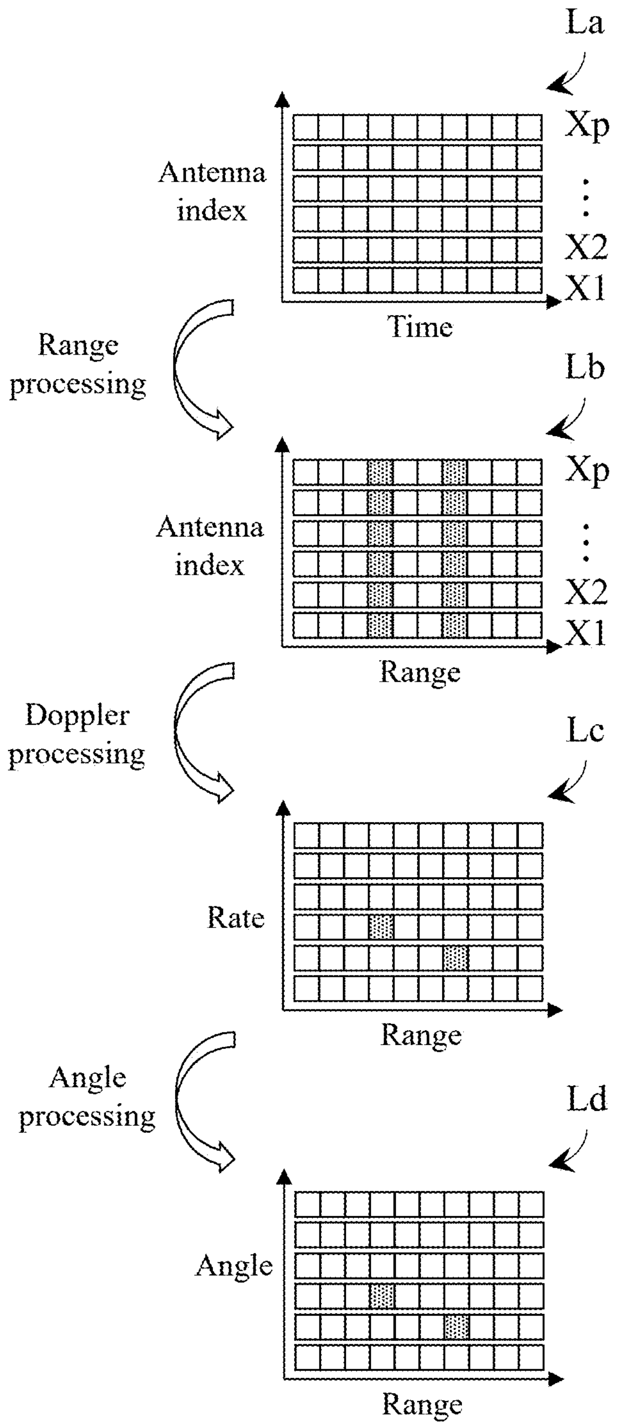
FIG. 5 is a schematic diagram of a signal processing process according to some embodiments of the present disclosure.

In step S402, range processing, Doppler processing, and angle processing are performed on the digital signal SD. Refer to FIG. 5. FIG. 5 is a schematic diagram of a signal processing process according to some embodiments of the present disclosure. FIG. 5 shows a process of sequentially performing range processing, Doppler processing, and angle processing on the digital signal SD. An example in which a matrix La is processed is used herein for description. The matrix La may be any one of the matrices A1 to An. Range processing is performed on the matrix La to obtain a matrix Lb. Range processing includes range Fast Fourier Transform (range FFT). To detect objects within different ranges (distances), FFT processing is performed on each digital signal SD. A data length of the digital signal SD corresponds to cycle time of the chirp signal, and may represent information of fast time. Since the frequency of the chirp signal linearly increases with time, a frequency domain distribution generated through FFT processing may reflect a distance distribution. Each peak value (for example, a colored region) obtained after FFT processing represents that there is an object at a corresponding distance. This is referred to as range FFT. A horizontal axis of the matrix Lb is the range (distance), and a longitudinal axis of the matrix Lb is an antenna index.

Doppler processing is performed on the matrix Lb to obtain a matrix Lc. Doppler processing includes Doppler Fast Fourier Transform (Doppler FFT). For a target of interest, range FFT may be repeatedly performed corresponding to the plurality of chirp signals. Information covering duration of the plurality of chirp signals may represent information of low time. Secondary FFT in a slow time direction may be performed to obtain a frequency distribution representing a phasor change. This is referred to as Doppler FFT. A Doppler FFT result is a two-dimensional complex matrix whose peak value (for example, a colored region) corresponds to a Doppler frequency shift (which may be physiological information such as a breath and a heartbeat or movement rate information of the object, where an information meaning may be distinguished based on a frequency value) of a dynamic target.

Angle processing is performed on the matrix Lc to obtain a matrix Ld. Angle processing includes angle Fast Fourier Transform (angle FFT). When there are two objects with a same distance and a same speed relative to the radar detection system 100, range FFT and Doppler FFT cannot work, and the two objects cannot be distinguished. In this case, an angle of arrival (AOA) needs to be estimated. Since the object is at a different distance from each antenna, the AOA is estimated based on a phasor change of a peak value obtained after range FFT or Doppler FFT, which needs at least two receiving antennae 209-1 to 209-N. A direction of the object is detected based on a phasor difference between two antennae. Similarly, FFT may be performed on a phasor sequence corresponding to a peak value obtained through two-dimensional FFT (range FFT and Doppler FFT) performed on the digital signals SD of the plurality of receiving antennae 209-1 to 209-N, to solve a problem of angle estimation. This method is referred to as angle FFT. Each peak value (for example, a colored region) obtained after angle FFT processing represents that there is an object at a corresponding angle. In some embodiments, in addition to the AOA, angle of departure (AOD) estimation or another algorithm such as a multiple signal classification (MUSIC) algorithm may also be used to calculate a direction angle of the object.

In some embodiments, the peak value is selected based on a threshold. A value of the threshold may be determined by experimental data.

Figure 6:
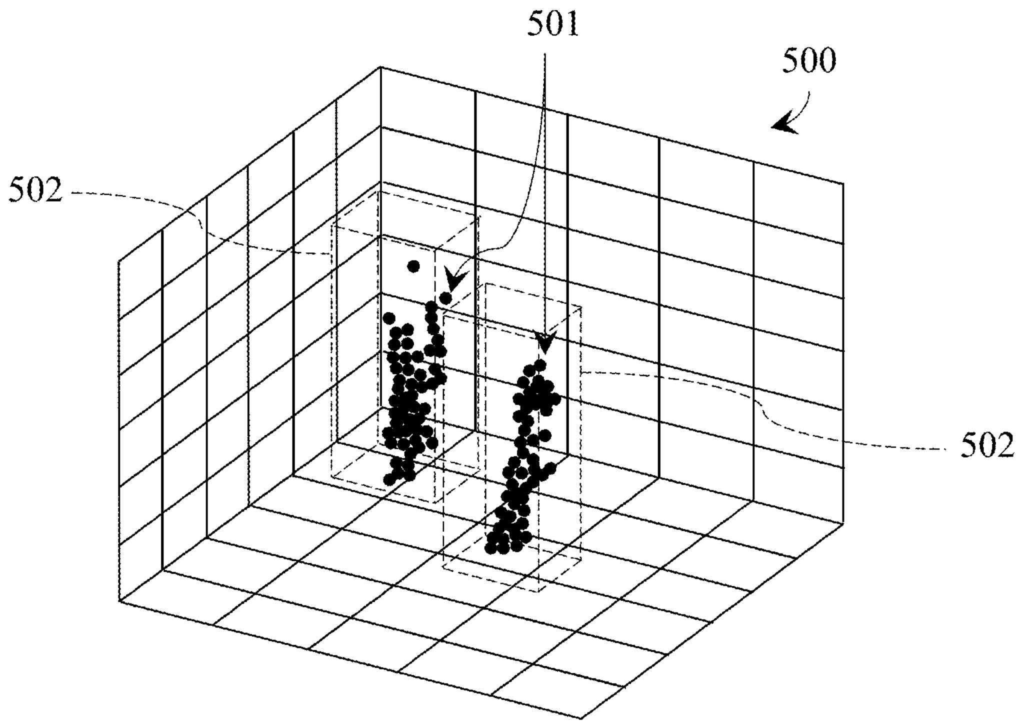
FIG. 6 is a point-cloud image according to some embodiments of the present disclosure.

In step S403, a first point-cloud image is generated based on data obtained through processing in step S402. Refer to FIG. 6. FIG. 6 shows a point-cloud image according to some embodiments of the present disclosure. A point-cloud image 500 includes a plurality of points 501. The points 501 are distributed corresponding to a reflection region of the two objects in the detection region. However, this is merely an example, and is not intended to indicate a quantity of clusters 502 in the point-cloud image 500 according to each embodiment. A three-dimensional point-cloud image is presented, but the point-cloud image generated is not limited to be three-dimensional in the present disclosure. In some embodiments, the point-cloud image generated may be a two-dimensional point-cloud image.

It is particularly to be noted herein that since the peak value obtained after Doppler processing is related to the dynamic target, a subsequent angle processing result also includes only angle information of the dynamic target. Therefore, the first point-cloud image generated in step S403 includes only points 501 of the dynamic target. When the dynamic target is static, the points 501 in the first point-cloud image disappear.

In step S404, whether there is the dynamic target is determined. If there is the dynamic target, step S405 is performed; or if there is not the dynamic target, step S406 is performed. A determining manner is recognizing whether there is a cluster (referred to as a first cluster herein) in the first point-cloud image based on a result in step S403. If there is the first cluster, it indicates that there is the dynamic target in the FOV of the radar unit 105.

In step S405, a location (referred to as a first location herein) of the first cluster (that is, the dynamic target) is recorded in response to recognizing that there is the first cluster in the first point-cloud image. Then, a next scanning round (step S411) is performed.

Figure 7:
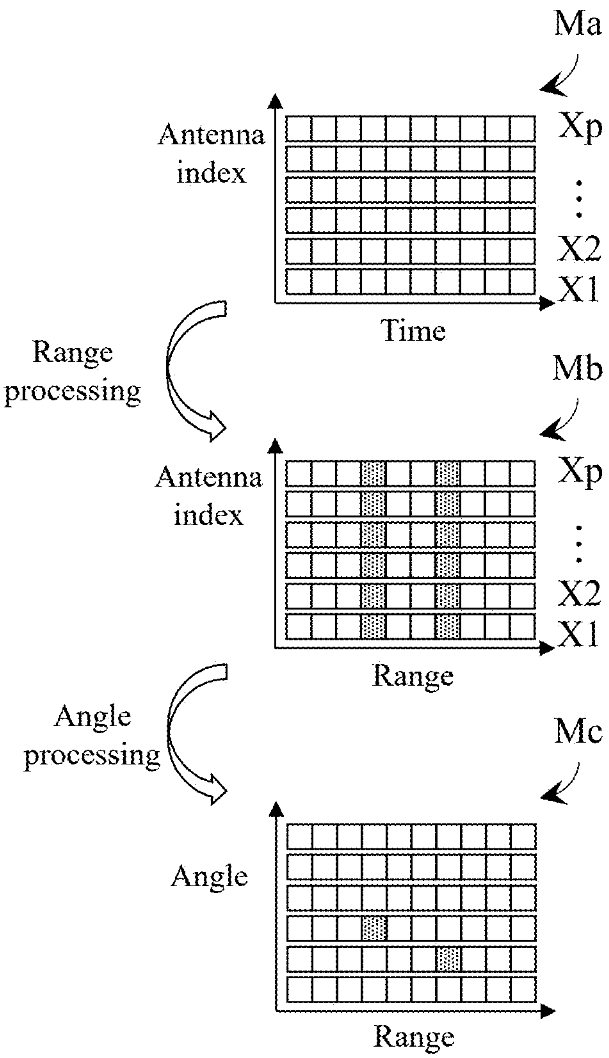
FIG. 7 is a schematic diagram of a signal processing process according to some embodiments of the present disclosure.

In step S406, range processing and angle processing are performed on the digital signal SD in response to recognizing that there is not the first cluster in the first point-cloud image (that is, a point cloud disappears). Refer to FIG. 7. FIG. 7 is a schematic diagram of a signal processing process according to some embodiments of the present disclosure. FIG. 7 shows a process of sequentially performing range processing and angle processing on the digital signal SD. An example in which a matrix Ma is processed is used herein for description. The matrix Ma may be any one of the matrices A1 to An. Range processing is performed on the matrix Ma to obtain a matrix Mb. Angle processing is performed on the matrix Mb to obtain a matrix Mc. Specific content of range processing and angle processing is the same as the foregoing description, and details are not described herein again. In some embodiments, range processing in step S406 may be omitted, and the range processing result (the matrix Lb) in step S402 is directly used to continue to perform angle processing.

In step S407, a second point-cloud image is generated based on data obtained through processing in step S406. It is to be noted that since step S406 does not include Doppler processing, the angle processing result can provide angle information of a static target. Therefore, the second point-cloud image generated in step S407 includes points 501 of the static target.

In step S408, whether there is the static target at an original object location is determined. In other words, whether there is a second cluster at a corresponding recorded first location in the second point-cloud image is recognized. Specifically, a location (referred to as a second location) of the second cluster is recognized, and whether the first location is substantially the same as the second location is determined. If there is the static target at the original object location, step S409 is performed; or if there is not the static target at the original object location, step S410 is performed.

In step S409, it is recognized that a tracking target is static in response to recognizing that there is the second cluster at the first location. Then, a next scanning round (step S411) is performed.

In step S410, it is recognized that a tracking target departs from the FOV of the radar unit 105 in response to recognizing that there is not the second cluster at the first location. Then, a next scanning round (step S411) is performed.

Figure 8:
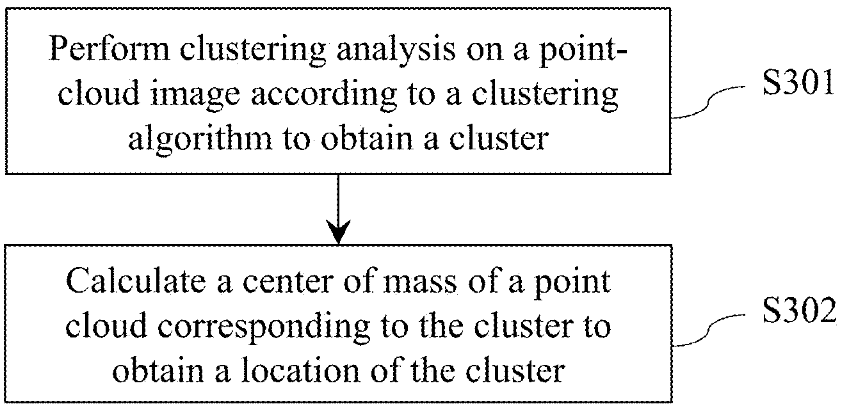
FIG. 8 is a flowchart of cluster recognition according to some embodiments of the present disclosure.

Refer to FIG. 8. FIG. 8 is a flowchart of cluster recognition according to some embodiments of the present disclosure. Cluster recognition is performed to recognize whether there is a cluster in a point-cloud image and obtain a location of the cluster (for example, in step S404 and step S408). In step S301, clustering analysis is performed on the point-cloud image according to a clustering algorithm to obtain a cluster. The points 501 shown in FIG. 6 are classified as a cluster 502. In some embodiments, the clustering algorithm is density-based spatial clustering of applications with noise (DBSCAN). In step S302, a center of mass of a point cloud (including the plurality of points 501) corresponding to the cluster is calculated to obtain a location of the cluster.

Through the process in the foregoing embodiments, after the point cloud in the first point-cloud image disappears, a state of the tracking target may continue to be detected through the second point-cloud image, to know that the point cloud in the first point-cloud image disappears because the tracking target is static or departs.

Figure 9:
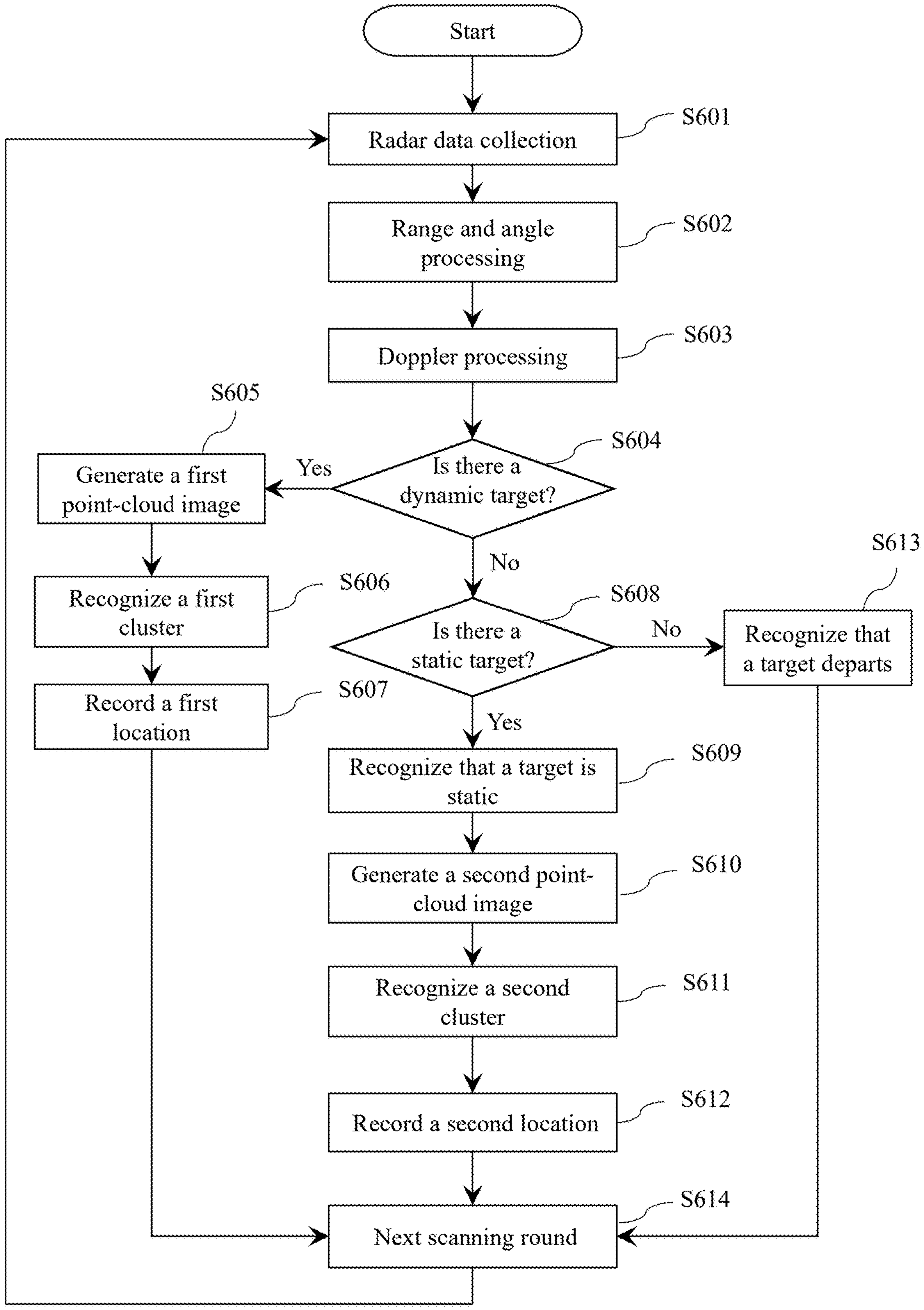
FIG. 9 is a flowchart of an object tracking method based on radar point cloud according to an embodiment of the present disclosure.

Refer to FIG. 9. FIG. 9 is a flowchart of an object tracking method based on radar point cloud according to an embodiment of the present disclosure. The method is applicable to a single tracking target. Step S601 is the same as step S401, that is, the radar unit 105 collects and demodulates a radar echo to obtain a digital signal SD. Details are not described herein again. The processing unit 103 performs steps S602 to S613 in a scanning round based on radar data collected in step S601.

Figure 10:
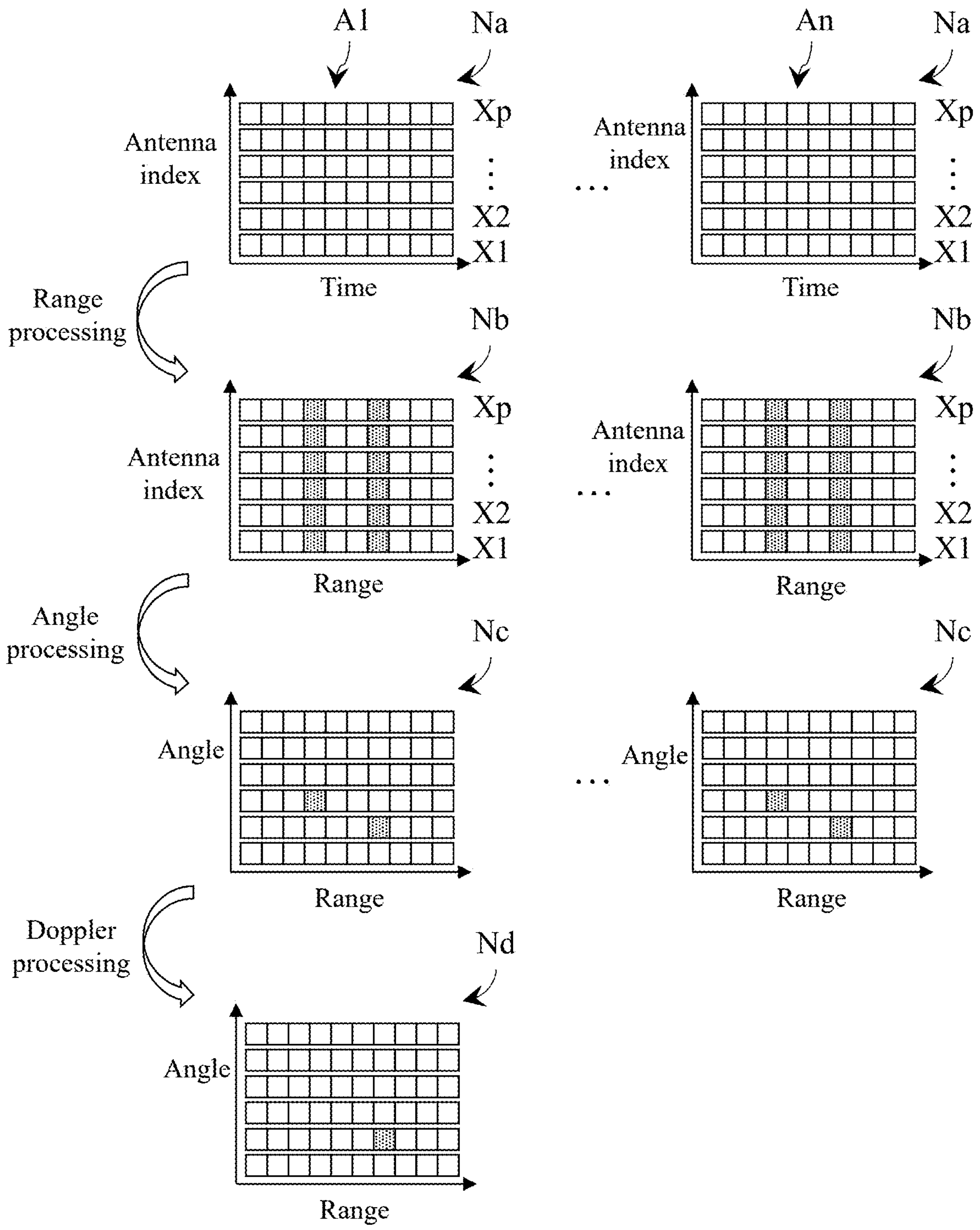
FIG. 10 is a schematic diagram of a signal processing process according to some embodiments of the present disclosure.

In step S602, range processing and angle processing are performed on the digital signal SD to obtain first data. Refer to FIG. 10. FIG. 10 is a schematic diagram of a signal processing process according to some embodiments of the present disclosure. FIG. 10 shows a process of sequentially performing range processing, angle processing, and Doppler processing on the digital signal SD. An example in which a matrix Na is processed is used herein for description. The matrix Na may be any one of the matrices A1 to An. Range processing is performed on the matrix Na to obtain a matrix Nb. Angle processing is performed on the matrix Nb to obtain a matrix Nc. Specific content of range processing and angle processing is the same as the foregoing description, and details are not described herein again. Step S602 is equivalent to range processing and angle processing performed in step S406, and details are not described herein again. The first data is the matrix Nc.

In step S603, Doppler processing is performed on the first data to obtain second data. Doppler processing is performed on the matrix Nc to obtain a matrix Nd. Doppler processing is similar to Doppler processing in FIG. 5, and range FFT and angle FFT are repeatedly performed corresponding to a plurality of chirp signals to obtain information covering duration of the plurality of chirp signals, and FFT is performed in a slow time direction to obtain a frequency distribution representing a phasor change, that is, the matrix Nd. A peak value (for example, a colored region) of the matrix Nd corresponds to a Doppler frequency shift of a dynamic target. Comparison between the matrix Nc and the matrix Nd shows that the matrix Nc includes two peak values and the matrix Nd includes only one peak value, and this is because location information of a static target is present in the matrix Nc but not in the matrix Nd. Herein, the second data is the matrix Nd.

In step S604, whether there is a peak value (referred to as a first peak value hereinafter) in the second data is recognized. The second data is obtained through Doppler processing, and only information of the dynamic target can be obtained based on the second data. Therefore, if there is the first peak value in the second data, it indicates that there is the dynamic target in an FOV of the radar unit 105, and step S605 is further performed; or if there is not the first peak value in the second data, it indicates that there is not the dynamic target, and step S608 is further performed.

In step S605, a first point-cloud image is generated based on the second data in response to recognizing that there is the first peak value in the second data. Since a peak value obtained after Doppler processing is related to the dynamic target, a subsequent angle processing result also includes only angle information of the dynamic target. Therefore, the first point-cloud image generated in step S605 includes only points 501 of the dynamic target.

In step S606, a cluster (referred to as a first cluster herein) in the first point-cloud image is recognized. A specific process is as shown in FIG. 8. Clustering analysis is performed on the first point-cloud image according to a clustering algorithm to obtain the first cluster, and a center of mass of a point cloud corresponding to the first cluster is calculated to obtain a location (referred to as a first location herein) of the first cluster.

In step S607, the first location of the first cluster is recorded. Then, a next scanning round (step S614) is performed.

In step S608, whether there is a peak value (referred to as a second peak value hereinafter) in the first data is further recognized in response to recognizing that there is not the first peak value in the second data. Doppler processing is not performed on the first data, so that the first data includes information of the static target. If there is the second peak value in the first data, it indicates that there is the static target in an FOV of the radar unit 105, and step S609 is further performed; or if there is not the second peak value in the first data, it indicates that there is not the static target, and step S613 is further performed.

In step S609, it is recognized that a tracking target is in a static state in response to recognizing that there is the second peak value in the first data. Then, step S610 is performed.

In step S610, a second point-cloud image is generated based on the first data in response to recognizing that there is the second peak value in the first data. Since Doppler processing is not performed on the first data, an angle processing result can provide angle information of the static target. Therefore, the second point-cloud image generated in step S610 includes points 501 of the static target.

In step S611, a cluster (referred to as a second cluster herein) in the second point-cloud image is recognized. A specific process is as shown in FIG. 8. Clustering analysis is performed on the second point-cloud image according to a clustering algorithm to obtain the second cluster, and a center of mass of a point cloud corresponding to the second cluster is calculated to obtain a location (referred to as a second location herein) of the second cluster.

In step S612, the second location of the second cluster is recorded. Then, a next scanning round (step S614) is performed.

In step S613, it is recognized that a tracking target departs from the FOV of the radar unit 105 in response to recognizing that there is not the second peak value in the first data. Then, a next scanning round (step S614) is performed.

Through the process in the foregoing embodiments, a moving detection target may be detected through the first point-cloud image, and a static state or a departing state of the detection target may be detected through the second point-cloud image.

Figure 11:
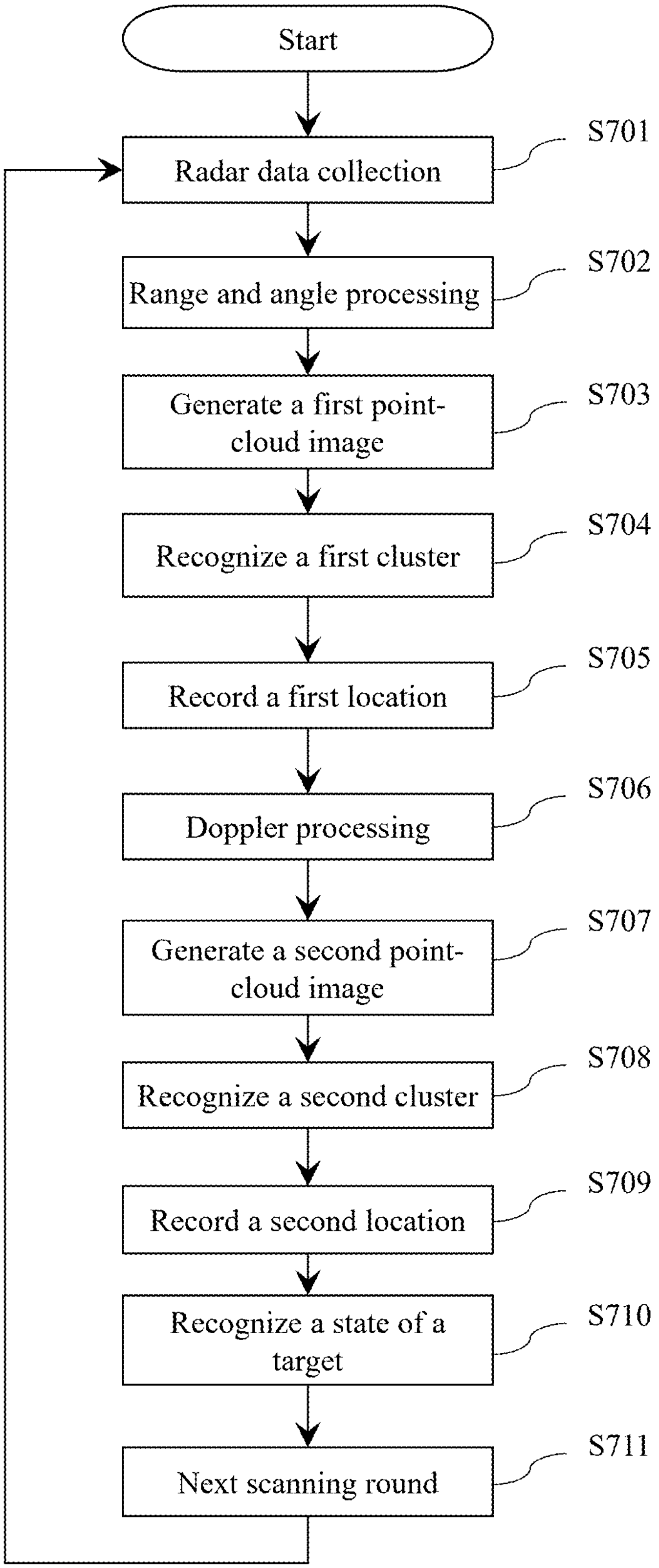
FIG. 11 is a flowchart of an object tracking method based on radar point cloud according to an embodiment of the present disclosure.

Refer to FIG. 11. FIG. 11 is a flowchart of an object tracking method based on radar point cloud according to an embodiment of the present disclosure. The method is applicable to one or more tracking targets. Step S701 is the same as step S401, that is, the radar unit 105 collects and demodulates a radar echo to obtain a digital signal SD. Details are not described herein again. The processing unit 103 performs steps S702 to S710 in a scanning round based on radar data collected in step S701.

In step S702, range processing and angle processing are performed on the digital signal SD to obtain first data. Step S702 is equivalent to range processing and angle processing performed in step S602, and details are not described herein again.

In step S703, a first point-cloud image is generated based on the first data. Since Doppler processing is not performed on the first data, an angle processing result can provide angle information of a dynamic target and a static target. Therefore, the first point-cloud image generated in step S703 includes only points 501 of the dynamic target and the static target.

In step S704, a cluster (referred to as a first cluster herein) in the first point-cloud image is recognized. A specific process is as shown in FIG. 8. Clustering analysis is performed on the first point-cloud image according to a clustering algorithm to obtain the first cluster, and a center of mass of a point cloud corresponding to the first cluster is calculated to obtain a location (referred to as a first location herein) of the first cluster.

In step S705, the first location of the first cluster is recorded. Herein, the first location includes locations of the dynamic target and the static target. After the tracking targets are updated to latest locations, step S706 is performed.

In step S706, Doppler processing is performed on the first data to obtain second data. Step S706 is the same as step S603, and details are not described herein again.

In step S707, a second point-cloud image is generated based on the second data. The second data is obtained through Doppler processing, so that information of the dynamic target may be obtained from the second data. Therefore, the second point-cloud image generated in step S707 includes points 501 of the dynamic target.

In step S708, a cluster (referred to as a second cluster herein) in the second point-cloud image is recognized. A specific process is as shown in FIG. 8. Clustering analysis is performed on the second point-cloud image according to a clustering algorithm to obtain the second cluster, and a center of mass of a point cloud corresponding to the second cluster is calculated to obtain a location (referred to as a second location herein) of the second cluster.

In step S709, the second location of the second cluster is recorded. Herein, the second location includes only a location of the dynamic target. After the tracking targets are updated to latest locations, step S710 is performed.

Figure 12:
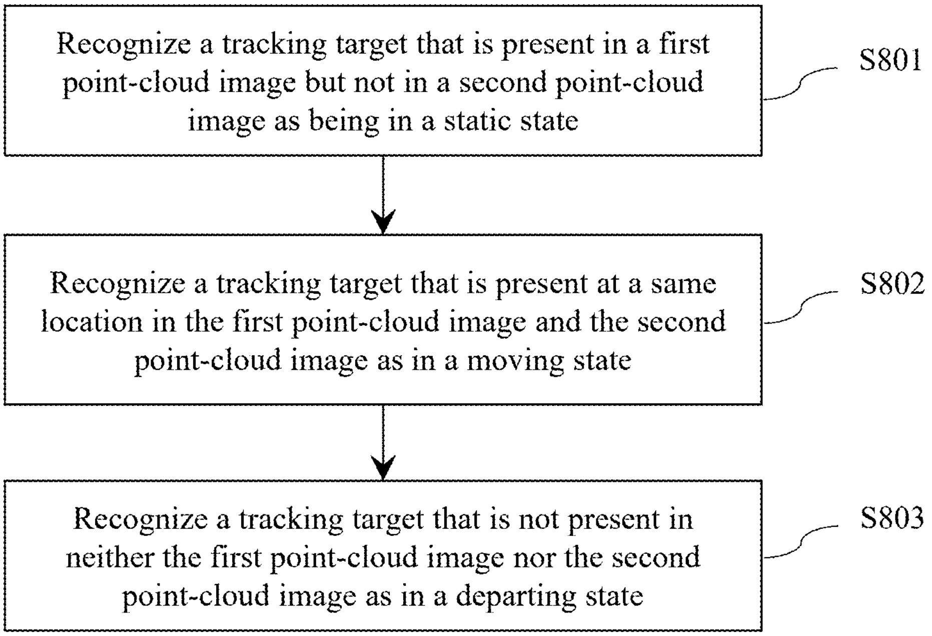
FIG. 12 is a flowchart of state determining according to some embodiments of the present disclosure.

In step S710, a state of the tracking target is recognized based on the first location and the second location that are recorded. The first location includes locations of all tracking targets, and the second location includes the location of the dynamic target. Therefore, after the first location and the second location are compared, it may be determined that a state of each tracking target is a moving state, a static state, or a departing state. Specifically, refer to FIG. 12. FIG. 12 is a flowchart of state determining according to some embodiments of the present disclosure. If a specific tracking target is present in the first point-cloud image but not in the second point-cloud image, the corresponding tracking target is recognized as being in a static state (step S801). If a specific tracking target is present at a same location in the first point-cloud image and the second point-cloud image, the corresponding tracking target is recognized as in a moving state (step S802). If a specific tracking target is present in neither the first point-cloud image nor the second point-cloud image, the corresponding tracking target is recognized as in a departing state (step S803). In some embodiments, step S801 to step S803 may be performed in any sequence or in parallel. After the tracking target is updated to a latest state, a next scanning round (step S711) is performed.

Figure 13:
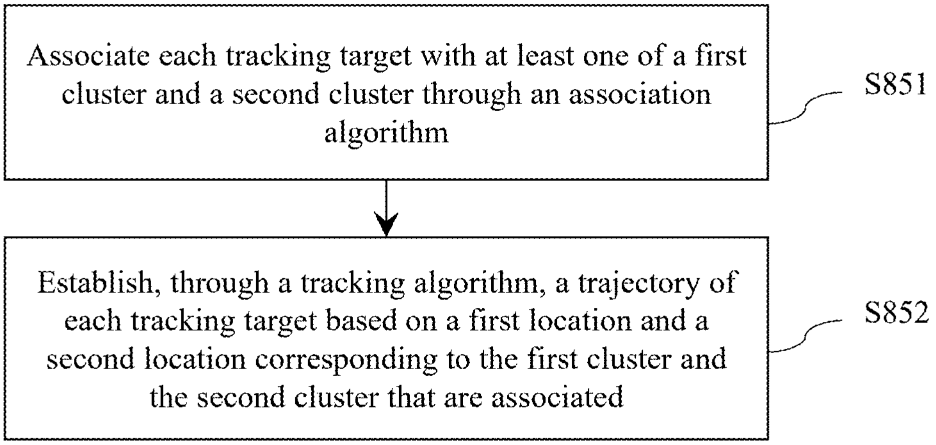
FIG. 13 is a flowchart of object tracking according to some embodiments of the present disclosure.

In some embodiments, step S710 includes step S851 and step S852, to distinguish tracking targets respectively corresponding to the clusters in the first point-cloud image and the second point-cloud image. Refer to FIG. 13. FIG. 13 is a flowchart of object tracking according to some embodiments of the present disclosure.

In step S851, each tracking target is associated with at least one of the first cluster and the second cluster through an association algorithm. In other words, the association algorithm establishes an association between each cluster and each tracking target based on a location of each tracking target and a location of each cluster, to confirm a recognition mark of each cluster. In some embodiments, the association algorithm is a Hungarian algorithm, which establishes a cost matrix for each cluster in a current frame and each tracking target and minimizes a combined distance loss to assign each cluster in the current frame to each tracking target. The cost matrix may be a non-square matrix because a quantity of tracking targets may be different from that of clusters in the current frame. An element $M_{i,j}$ of the cost matrix is a distance between a recorded location of a tracking target i and a location of a cluster j in the current frame. If a value of $M_{i,j}$ exceeds a threshold, the value is set as a large real number L to avoid association, to indicate that the corresponding cluster j is an addition. If the cluster j is mapped to an augmented dimension or a correspondence with a value of L, such mapping is ignored, and a new trajectory is created for the cluster j. Similarly, if the tracking target i is mapped to an augmented dimension or a correspondence with a value of L, it is recognized that the tracking target i is not detected. Therefore, a correspondence between each tracking target and each cluster can be ensured.

In some embodiments, the association algorithm may be another algorithm such as global nearest neighbor (GNN), a probabilistic data association filter, or a joint probabilistic data association filter.

In step S852, a trajectory of each tracking target is established through a tracking algorithm based on the first location and the second location corresponding to the first cluster and the second cluster that are associated. In some embodiments, the tracking algorithm is a Kalman filter. A next location of each cluster is predicted based on a location of each cluster, so that a prediction guidance is provided when the tracking target cannot be detected in a case of occlusion or temporary loss of the FOV. For each trajectory, a state is maintained, including a location and a speed in an x axis and a y axis. For each trajectory, an initial state includes a location and a speed that are first detected. In each continuous time step, the Kalman filter updates a current state variable with a transfer matrix and corresponding uncertainty. A new location/speed and a new covariance are estimated based on a current location and speed.

In some embodiments, the tracking algorithm may be another algorithm such as an extended Kalman filter (EKF), an unscented Kalman filter, an interacting multiple model (IMM) algorithm, or a probability hypothesis density filter.

In some embodiments, trajectory recognition further combines a body type and physiological information of the tracking target. Specifically, for each frame in the trajectory, a bounding box with a fixed size is used to enclose points of a potential object, and the points are voxelized into an occupancy grid. The occupancy grid inherently encapsulates shape information of the tracking target. For example, a tall person usually has a higher center of gravity. In addition, trajectory prediction may be performed under an assistance of the physiological information (for example, a breath and a heartbeat), and recognizability of the tracking target is enhanced through a difference between physiological information corresponding to the clusters. As described above, the physiological information may be obtained through Doppler FFT.

Through the process in the foregoing embodiments, it may be detected through the first point-cloud image and the second point-cloud image that the tracking target is in a moving state, a static state, or a departing state.

In some embodiments, the processing unit 103 includes one or more processing modules. In some embodiments, the processing unit 103 is partially located in the radar unit 105. For example, the processing unit 103 includes a first processing module and a second processing module. The first processing module is located in the radar unit 105, and is configured to perform a part of signal processing and transmit a processing result to the second processing module, so that the second processing module continues to perform the rest of signal processing.

In some embodiments, the processing module includes a processor, an internal memory, or a non-volatile memory. The internal memory is, for example, a random access memory (RAM). Definitely, the processing module may further include hardware required by another function.

The internal memory and the non-volatile memory are configured to store programs. The programs may include program code. The program code includes computer operation instructions. The internal memory and the non-volatile memory provide instructions and data for the processor. The processor reads a corresponding computer program from the non-volatile memory to the internal computer for running. The processor is specifically configured to perform the steps in the foregoing flowcharts.

The processor may be an integrated circuit chip, and has a signal processing capability. During implementation, each method and step disclosed in the foregoing embodiments may be completed by an integrated logic circuit in a hardware form in the processor or instructions in a software form. The processor may be a general-purpose processor, including a central processing unit (CPU), a tensor processing unit, a digital signal processor (DSP), an application specified integrated circuit (ASIC), a field-programmable gate array (FPGA), or another programmable logic apparatus, and may implement or perform each method and step disclosed in the foregoing embodiments.

In some embodiments of the present disclosure, a computer-readable recording medium storing a program is further provided. The computer-readable recording medium stores at least one instruction. The at least one instruction, when executed by the processing unit 103, may cause the processing unit 103 to perform each method and step disclosed in the foregoing embodiments.

An example of the computer-readable recording medium includes but is not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another internal memory technology, a compact disc read-only memory (CD-ROM), a digital versatile disk (DVD) or another optical memory, a magnetic cassette tape, a magnetic tape disk memory or another magnetic storage device, or any other non-transmission medium, and is configured to store information accessible by a computing device. As defined in this specification, the computer-readable recording medium does not include transitory media, for example, a modulated data signal and carrier.

According to the object tracking method based on radar point clouds proposed in some embodiments of the present disclosure, a problem that the state of the tracking target cannot be tracked with disappearance of a conventional point cloud can be solved, and it can be determined that the conventional point cloud disappears because the tracking target is static or departs.

What is claimed is:

1. An object tracking method based on radar point cloud, comprising:
collecting and demodulating, by a radar unit, a radar echo to obtain a digital signal; and
performing, by a processing unit, the following steps:
performing range processing, Doppler processing, and angle processing on the digital signal to obtain a first point-cloud image;
determining there is a first cluster in the first point-cloud image; and
recording a first location of the first cluster in response to determining that there is the first cluster in the first point-cloud image;
performing range processing and angle processing on the digital signal to obtain a second point-cloud image in response to determining that there is not the first cluster in the first point-cloud image;
determining there is a second cluster at a corresponding recorded first location in the second point-cloud image; and
determining a tracking target is in a static state in response to determining that there is the second cluster at the first location.

2. The object tracking method based on radar point cloud according to claim 1, wherein the step of determining there is a first cluster in the first point-cloud image comprises:
performing clustering analysis on the first point-cloud image according to a clustering algorithm to obtain the first cluster.

3. The object tracking method based on radar point cloud according to claim 2, wherein the step of determining there is a first cluster in the first point-cloud image further comprises:
calculating a center of mass of a point cloud corresponding to the first cluster to obtain the first location of the first cluster.

4. The object tracking method based on radar point cloud according to claim 1, further comprising:
determining that the tracking target departs from a field of view of the radar unit in response to determining that there is not the second cluster at the first location.

5. The object tracking method based on radar point cloud according to claim 1, wherein the step of determining there is a second cluster in the second point-cloud image comprises:
performing clustering analysis on the second point-cloud image according to a clustering algorithm to obtain the second cluster.

6. The object tracking method based on radar point cloud according to claim 5, wherein the step of determining there is a second cluster in the second point-cloud image further comprises:
calculating a center of mass of a point cloud corresponding to the second cluster to obtain a second location of the second cluster.

7. An object tracking method based on radar point cloud, comprising:
collecting and demodulating, by a radar unit, a radar echo to obtain a digital signal; and
performing, by a processing unit, the following steps:
performing range processing and angle processing on the digital signal to obtain first data;
performing Doppler processing on the first data to obtain second data;
determining there is a first peak value in the second data;
determining there is a second peak value in the first data in response to determining that there is not the first peak value in the second data; and
determining that a tracking target is in a static state in response to determining that there is the second peak value in the first data.

8. The object tracking method based on radar point cloud according to claim 7, further comprising:
generating a first point-cloud image based on the second data in response to determining that there is the first peak value in the second data.

9. The object tracking method based on radar point cloud according to claim 8, wherein after generating the first point-cloud image, the method further comprises:
performing clustering analysis on the first point-cloud image according to a clustering algorithm to obtain a first cluster.

10. The object tracking method based on radar point cloud according to claim 9, wherein after obtaining the first cluster, the method further comprises:
calculating a center of mass of a point cloud corresponding to the first cluster to obtain a first location of the first cluster; and
recording the first location of the first cluster.

11. The object tracking method based on radar point cloud according to claim 7, further comprising:
generating a second point-cloud image based on the first data, and obtaining a second cluster corresponding to the second peak value; and
recording a second location of the second cluster.

12. The object tracking method based on radar point cloud according to claim 11, wherein the step of obtaining a second cluster corresponding to the second peak value comprises:
performing clustering analysis on the second point-cloud image according to a clustering algorithm to obtain the second cluster; and
calculating a center of mass of a point cloud corresponding to the second cluster to obtain the second location of the second cluster.

13. The object tracking method based on radar point cloud according to claim 7, further comprising:
determining that the tracking target departs from a field of view of the radar unit in response to determining that there is not the second peak value in the first data.

14. An object tracking method based on radar point cloud, comprising:
collecting and demodulating, by a radar unit, a radar echo to obtain a digital signal; and
performing, by a processing unit, the following steps:
performing range processing and angle processing on the digital signal to obtain first data;
generating a first point-cloud image based on the first data;
recording a first location of at least one first cluster based on the first point-cloud image;
performing Doppler processing on the first data to obtain a second point-cloud image;
recording a second location of at least one second cluster based on the second point-cloud image; and
determining that a state of at least one tracking target based on the first location and the second location.

15. The object tracking method based on radar point cloud according to claim 14, wherein before the step of recording a first location of at least one first cluster, the method further comprises:

performing clustering analysis on the first point-cloud image according to a clustering algorithm to obtain the at least one first cluster.

16. The object tracking method based on radar point cloud according to claim 15, wherein after obtaining the at least one first cluster, the method further comprises:

calculating a center of mass of a point cloud corresponding to the at least one first cluster to obtain the first location of the at least one first cluster; and recording the first location of the at least one first cluster.

17. The object tracking method based on radar point cloud according to claim 14, wherein before the step of recording a second location of at least one second cluster, the method further comprises:

performing clustering analysis on the second point-cloud image according to a clustering algorithm to obtain the at least one second cluster.

18. The object tracking method based on radar point cloud according to claim 17, wherein after obtaining the at least one second cluster, the method further comprises:

calculating a center of mass of a point cloud corresponding to the at least one second cluster to obtain the second location of the at least one second cluster; and recording the second location of the at least one second cluster.

19. The object tracking method based on radar point cloud according to claim 14, further comprising:

associating each tracking target with at least one of the first cluster and the second cluster through an association algorithm; and establishing, through a tracking algorithm, a trajectory of each tracking target based on the first location and the second location corresponding to the first cluster and the second cluster that are associated.

20. The object tracking method based on radar point cloud according to claim 14, wherein the determining a state of at least one tracking target is determining a tracking target that is present in the first point-cloud image but not in the second point-cloud image as being in a static state.

* * * * *